C. BOZILE.
MILK STOOL AND SCALE.
APPLICATION FILED SEPT. 7, 1915.
1,197,100.
Patented Sept. 5, 1916.
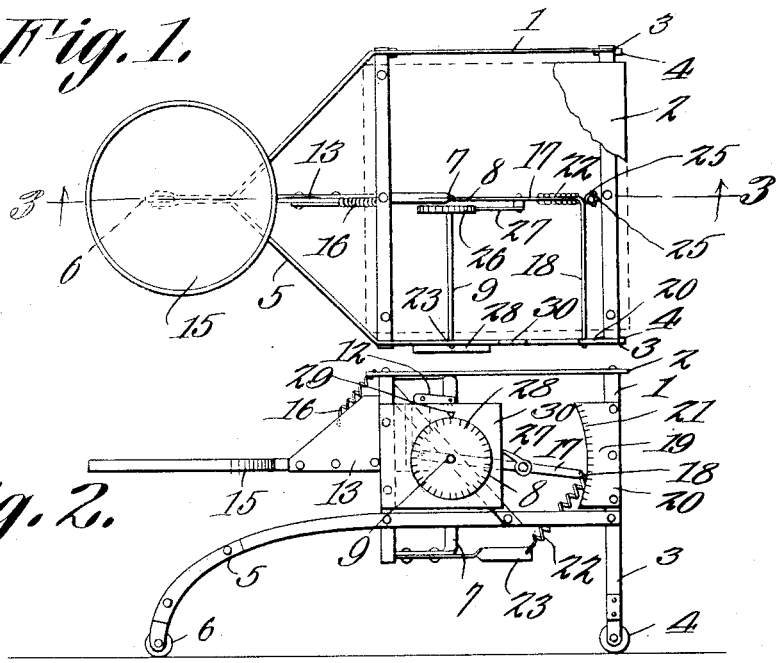
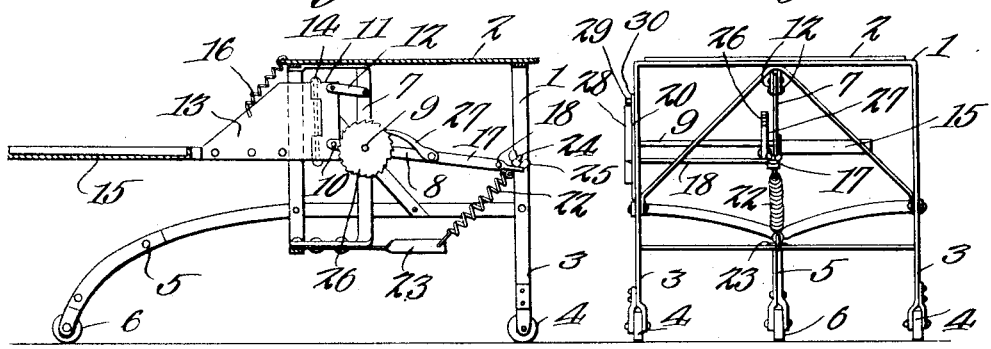
Witnesses
H. B. Wooden
M. E. Tracey
Charles Bozile
Inventor,
by C. A. Snow & Co.
Attorneys.

UNITED STATES PATENT OFFICE.

CHARLES BOZILE, OF NEW LONDON, WISCONSIN.

MILK STOOL AND SCALE.

1,197,100.     Specification of Letters Patent.     Patented Sept. 5, 1916.

Application filed September 7, 1915. Serial No. 49,295.

*To all whom it may concern:*

Be it known that I, CHARLES BOZILE, a citizen of the United States, residing at New London, in the county of Waupaca and State of Wisconsin, have invented a new and useful Milk Stool and Scale, of which the following is a specification.

The present invention is a milking stool having a milk scale combined therewith, whereby the stool not only provides convenient means upon which the operator may sit during the milking operation, but also provides means whereby the milk will be weighed so that the quantity thereof can be noted.

It is the object of the invention to provide a novel and improved device of the character indicated, and comprising a novel assemblage of the component parts, to enhance the utility and efficiency thereof, the device having means for indicating the weight of the milk in the bucket supported by the device, and means for indicating the sum total weight of a number of buckets of milk.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in its preferred embodiment in the accompanying drawing, wherein:—

Figure 1 is a plan view of the improved device, portions being broken away. Fig. 2 is a side elevation of the device. Fig. 3 is a longitudinal section taken on the line 3—3 of Fig. 1. Fig. 4 is a rear end view.

In carrying out the invention, there is employed a suitable frame 1 constructed of bars of metal or other suitable material, and having at its rear end a pair of legs 3 at the opposite sides of the frame. Wheels 4 are pivoted to the lower ends of the legs 3 for movably supporting the legs, and the frame 1 has a forwardly projecting and down turned leg 5 provided with a wheel or roller 6 at its extremity. The wheels or rollers 4 and 6 permit the stool to be readily rolled about. Secured upon the frame 1 is a seat 2 upon which the operator can sit during the milking operation.

The frame 1 has an upright or vertical bar 7 therein to which a lever 8 is fulcrumed, said lever being pivoted loosely upon a transverse shaft 9 which is journaled through the bar 7 under the seat 2. The lever 8 has a short forwardly projecting arm 10 pivoted to the lower end of a plate 11, and the upper end of said plate is connected by links 12 to the bar 7. The short arm 10 of the lever 8 provides a link coöperating with the link 12 for supporting the plate 11 for vertical movement parallel with the bar 7. A plate 13 is hinged, as at 14, to the plate 11 and projects forwardly out of the frame 1 above the leg 5, and a horizontal tray-like platform 15 is carried by the plate 13 above the leg 5. The platform 15 can be swung horizontally or sidewise to a limited extent, since the plate 13 is hinged to the plate 11. The plate 13 is connected by a coiled spring 16 with the front edge of the seat 2 for yieldably supporting the plate 13 and platform 15.

The lever 8 has a relatively long rearwardly projecting arm 17 below the seat 2 and provided adjacent its free or rear end with a laterally or angularly projecting pointer 18 extending to one side of the frame and movable along the curved edge 19 of the plate 20 secured to one side of the frame adjacent the rear end thereof. The plate 20 has a suitable scale of graduations 21 along the edge 19 with which the pointer 18 is coöperable.

The rear arm 17 of the lever 8 is normally pulled downward to assist the spring 16 in yieldably raising the platform 15, and to this end a coiled spring 22 has its lower end engaged to a rearwardly projecting bracket 23 extending from the lower end of the bar 7, and the upper end of the spring 22 is connected to a screw 24 slidably engaged through the free end of the arm 17. A nut 25 is threaded upon the screw 24 and bears upon the arm 17, whereby the tension of the spring 22 may be regulated by rotating the nut 25, so that the scale may be made to operate properly.

A ratchet wheel 26 is secured upon the shaft 9 adjacent the lever 8, and a pawl or dog 27 is pivoted to the arm 17 of the lever 8 and engages the ratchet wheel 26. A suitably graduated dial 28 is secured upon the outer end of the shaft 9 at one side of the frame, and a pointer 29 coöperates with the graduated periphery of the dial 28. The pointer 29 is carried by a vertical plate 30 attached to the respective side of the frame and through which the shaft 9 is journaled. The friction between the dial 28 and plate 30 is ordinarily sufficient to prevent the accidental rotation of the dial. The dial 28 is graduated to indicate the sum total weight of the buckets of milk weighed, and the scale 21 is graduated to indicate the individual weight of a single bucket of milk.

In use, the bucket (not shown) is placed upon the platform 15, and when the bucket becomes filled with milk, the platform 15 is depressed against the tension of the springs 16 and 22. When the platform 15 is depressed with the plate 13, the plate 11 will be depressed therewith, and the lever 8 will be swung so that the arm 17 thereof swings upwardly. The pointer 18 is thus swung upwardly along the scale of graduations 21 which will indicate upon said scale, the weight of the bucket and milk contained in the bucket. The attendant or operator may thus observe the weight of the milk, and when the arm 17 is raised as above indicated, the pawl 27 will be raised to partially rotate the ratchet wheel 26. This will rotate the shaft 9 and dial 28 carried thereby, so that the dial 28 will be advanced proportionately to the weight of the milk. When the bucket of milk is removed, the platform 15 is again raised, and the arm 17 will be lowered to return the pointer 18 to zero, but the pawl 27 will not move the ratchet wheel 26 during the downward movement of the arm 17. When the next bucket of milk is weighed, the dial 28 is again advanced, and in this manner, a sum total of the weights of the various buckets of milk is obtained. The platform 15 can be swung sidewise or horizontally slightly for convenience in milking, and without interfering with the weighing operation. With the present device, the weights of the individual buckets of milk may be noted and recorded, and the aggregate weight of the several buckets of milk will be recorded also. The leg 5 projecting forwardly under the platform 15 prevents the stool from tilting when the bucket of milk is disposed upon the platform, even when the operator is not seated upon the stool.

Having thus described the invention, what is claimed as new is:—

1. A milk stool scale, comprising a milk stool having a pair of rear legs and a forwardly projecting leg, a bucket supporting platform movably mounted above said forwardly projecting leg, and means carried by the stool and operatively connected to said platform for indicating the weight of a bucket of milk thereon.

2. In a scale, a supporting member, a lever pivoted thereto, a plate pivoted to said lever, a link connecting said plate and supporting member and coöperating with the lever for mounting said plate for vertical movement, a platform carried by said plate, a pointer carried by said lever, a graduated scale with which said pointer is coöperable, a ratchet wheel, sum total indicating means advanced by said ratchet wheel, and a pawl pivoted to said lever and coöperating with the ratchet wheel.

3. In a scale, a supporting member, a shaft journaled therethrough, a lever pivoted upon said shaft, a plate pivoted to said lever, a link connecting said plate and supporting member and coöperable with the lever for mounting said plate for vertical movement, a platform carried by said plate, a pointer carried by the lever, a graduated scale with which said pointer is coöperable, a ratchet wheel secured upon said shaft, a pawl pivoted to the lever and coöperable with the ratchet wheel, and a dial carried by said shaft.

4. A milk stool scale, comprising a stool having a vertical bar therein, a shaft journaled to said bar and projecting to one side of the stool, a lever pivoted upon said shaft, and having a short forwardly projecting arm, a plate pivoted to said arm of the lever, a link connecting said plate and bar and coöperating with said arm of the lever for mounting the plate for vertical movement, a second plate hinged to the first mentioned plate, a platform carried by the second plate, said lever having a relatively long rearwardly projecting arm, a pointer carried by said rearwardly projecting arm, a graduated scale carried by one side of the plate with which said pointer is coöperable, a ratchet wheel secured upon said shaft, a pawl pivoted to said rearwardly projecting arm and coöperating with the ratchet wheel, a dial secured to said shaft at one side of the stool, and a pointer carried by the last mentioned side of the stool and coöperating with the dial.

In testimony that I claim the foregoing as my own, I have hereto affixed my signature in the presence of two witnesses.

CHARLES BOZILE.

Witnesses:
D. B. EGAN,
C. W. JUNEFF.

Copies of this patent may be obtained for five cents each, by addressing the "Commissioner of Patents, Washington, D. C."